United States Patent
Joo (10) Patent No.: US 9,509,570 B2
(45) Date of Patent: Nov. 29, 2016

(54) ROUTING APPARATUS AND METHOD FOR CONFIGURING LOW-POWER WIRELESS MESH NETWORK BASED ON CHANNEL HOPPING TIME-MULTIPLEXED WIRELESS LINK

(71) Applicant: Electronics and Telecommunications Research Institute, Daejeon (KR)

(72) Inventor: Seong-Soon Joo, Daejeon (KR)

(73) Assignee: ELECTRONICS AND TELECOMMUNICATIONS RESEARCH INSTIT, Daejeon (KR)

(*) Notice: Subject to any disclaimer, the term of this patent is extended or adjusted under 35 U.S.C. 154(b) by 162 days.

(21) Appl. No.: 14/310,140

(22) Filed: Jun. 20, 2014

(65) Prior Publication Data

US 2014/0376375 A1 Dec. 25, 2014

(30) Foreign Application Priority Data

Jun. 20, 2013 (KR) .................. 10-2013-0071176
May 16, 2014 (KR) .................. 10-2014-0059052

(51) Int. Cl.
*H04L 12/24* (2006.01)
*H04L 12/715* (2013.01)
*H04L 12/801* (2013.01)

(52) U.S. Cl.
CPC ............ *H04L 41/12* (2013.01); *H04L 45/46* (2013.01); *H04L 47/14* (2013.01)

(58) Field of Classification Search
None
See application file for complete search history.

(56) References Cited

U.S. PATENT DOCUMENTS

| 8,675,672 B1* | 3/2014 | Bao ................ H04L 45/46 370/408 |
| 8,831,008 B1* | 9/2014 | Gostev ...................... 370/396 |
| 8,885,548 B2* | 11/2014 | Pandey ............... H04W 8/005 370/324 |
| 2007/0019569 A1 | 1/2007 | Park et al. |
| 2012/0069869 A1* | 3/2012 | Jeong ............ H04L 12/40013 375/132 |
| 2012/0093056 A1* | 4/2012 | Shin .................. H04W 80/00 370/312 |
| 2013/0003596 A1* | 1/2013 | Lelkens ........... H04L 29/12283 370/252 |

FOREIGN PATENT DOCUMENTS

KR 1020120100184 A 9/2012

OTHER PUBLICATIONS

Robert F. Heile et al., "IEEE 802.15.4e-2012 (Part 15.4: Low-Rate Wireless Personal Area Networks (LR-WPANs))", LAN/MAN Standards Committee of the IEEE Computer Society, Apr. 16, 2012.

* cited by examiner

*Primary Examiner* — Steve Young
(74) *Attorney, Agent, or Firm* — William Park & Associates Ltd.

(57) ABSTRACT

Disclosed herein is a routing apparatus and method for configuring a LPWMN based on a channel hopping time-multiplexed wireless link. The routing apparatus of the present invention includes a control unit for setting up a channel hopping time-multiplexed wireless link with a gateway router, one or more routers, and one or more devices based on deterministic and synchronous multi-channel extension (DSME) media access control (MAC) link control (DSME MAC link control: DLC) sublayers and DSME MAC link network (DLN) sublayers. A communication unit transfers data frames to the gateway router, routers, and devices depending on connection quality of the channel hopping time-multiplexed wireless link.

14 Claims, 9 Drawing Sheets

ROUTING APPARATUS AND METHOD FOR CONFIGURING LOW-POWER WIRELESS MESH NETWORK BASED ON CHANNEL HOPPING TIME-MULTIPLEXED WIRELESS LINK

CROSS REFERENCE TO RELATED APPLICATIONS

This application claims the benefit of Korean Patent Application Nos. 10-2013-0071176, filed Jun. 20, 2013 and 10-2014-0059052, filed May 16, 2014, which are hereby incorporated by reference in their entirety into this application.

BACKGROUND OF THE INVENTION

1. Technical Field

The present invention relates to technology for configuring a mesh multi-hop path using a time multiplexed access-based low-power wireless link, selecting a path in consideration of quality upon transferring data, processing the transfer of the data, and operating and maintaining a multi-hop path.

2. Description of the Related Art

The present invention relates to technology for configuring a multi-hop path using a time multiplexed access-based low-power wireless link, selecting a path in consideration of quality upon transferring data, processing the transfer of the data, and operating and maintaining a multi-hop path.

A low-power wireless network takes into consideration a limitation in the transmission distance of a low-power device and link instability attributable to variations in a wireless environment. Also, a low-power wireless network requires the configuration of a network that provides various quality classes satisfying restrictive conditions in the configuration of a network, such as the minimization of transmission/reception activation time required for low-power operation and the minimization of transmission/reception messages required for the configuration and maintenance of a wireless network.

In particular, a channel hopping time-multiplexed low-power wireless link based on deterministic and synchronous multi-channel extension (DSME) media access control (MAC) has been provided in IEEE 802.15.4e-2012 standards so as to improve the reliability of a wireless link, and a low-power wireless mesh network to which such a link is optimally applied is urgently required.

PRIOR ART DOCUMENTS

Patent Documents

Patent Document 1: Korean Patent Application Publication No. 10-2012-0100184 (entitled "Low-power sense network-based photovoltaic array monitoring system and method")

SUMMARY OF THE INVENTION

Accordingly, the present invention has been made keeping in mind the above problems occurring in the prior art, and an object of the present invention is to provide an apparatus and method for configuring a low-power wireless mesh network, configuring a multi-hop path, transferring multi-quality data, selecting a path, and operating and maintaining the path, in a wireless network implemented using a time-multiplexed access wireless link.

In accordance with an aspect of the present invention to accomplish the above object, there is provided a routing apparatus for configuring a low-power wireless mesh network (LPWMN) configured based on a channel hopping time-multiplexed wireless link, including a control unit for setting up a channel hopping time-multiplexed wireless link with a gateway router, one or more routers, and one or more devices based on deterministic and synchronous multi-channel extension (DSME) media access control (MAC) link control (DSME MAC link control: DLC) sublayers and DSME MAC link network (DLN) sublayers; and a communication unit for transferring data frames to the gateway router, routers, and devices depending on connection quality of the channel hopping time-multiplexed wireless link.

The control unit may operate LPWMN primitives for allowing the routing apparatus to join the LPWMN, set up a path of the channel hopping time-multiplexed wireless link, and leave the LPWMN through a DLN-service access point (SAP) corresponding to DLN and a DLC-SAP corresponding to DLC.

The control unit selects a neighboring router, a number of hops from which to the gateway router is less than a number of hops from the routing apparatus to the gateway router, and a link quality of which is equal to or greater than a preset reference quality, as a primary inner router, based on the DLN sublayers, and then starts joining the channel hopping time-multiplexed wireless link.

The routing apparatus may further include a cluster unit for grouping the routers and devices into clusters, and assigning router identifiers and device identifiers to the clusters.

The cluster unit may configure the LPWMN in a form of a tree between an upper cluster and a lower cluster, and configures the clusters in a form of an intra-cluster mesh in each cluster and an inter-cluster mesh between routers of neighboring clusters.

The cluster unit may assign each of the routers and the devices a cluster identifier required to identify a cluster including the router and the device and a locator identifier required to identify locations of the router and the device in the cluster.

The cluster unit may be configured to, when the routing apparatus is a cluster root router, simultaneously assign the routing apparatus both a device identifier corresponding to an upper cluster to which the cluster root router is connected as a device, and a router identifier corresponding to a lower cluster to which the cluster root router is connected as a router.

The control unit may be configured to, when the routing apparatus is a cluster root router based on the DLN sublayers, receive cluster connectivity matrix information from the gateway router differing from the routing apparatus and join the LPWMN, and when the routing apparatus is not a cluster root router, receive cluster connectivity matrix information from a cluster root router differing from the routing apparatus and joining the LPWMN.

The control unit may receive, based on the DLC sublayers, a link network management command frame having a leave command payload from the cluster root router differing from the routing apparatus and then leaves the LPWMN.

The communication unit may be configured to use a contention access period (CAP) link, and transfer data frames without checking transfer of the data frames and performing flow control in a case of a first connection quality; use the CAP link, check transfer of data frames, and transfer the data frames without performing flow control in a case of a second connection quality; use a shared link, and transfer data frames without checking transfer of the data frames and performing flow control in a case of a third connection quality; use the shared link, check transfer of data frames, and transfer the data frames without performing flow control in the case of a fourth connection quality; use a dedicated link, and transfer data frames without checking transfer of the data frames and performing flow control in a case of a fifth connection quality; and use the dedicated link, check transfer of data frames, and transfer the data frames without performing flow control in a case of a sixth connection quality.

In accordance with an aspect of the present invention to accomplish the above object, there is provided a method of configuring a low-power wireless mesh network (LPWMN) based on a channel hopping time-multiplexed wireless link, including setting up a channel hopping time-multiplexed wireless link with a gateway router, one or more routers, and one or more devices based on deterministic and synchronous multi-channel extension (DSME) media access control (MAC) link control (DSME MAC link control: DLC) sublayers and DSME MAC link network (DLN) sublayers; and transferring data frames to the gateway router, routers, and devices depending on connection quality of the channel hopping time-multiplexed wireless link.

Setting up the channel hopping time-multiplexed wireless link may include operating LPWMN primitives for allowing the routers and the devices to join the LPWMN, set up a path of the channel hopping time-multiplexed wireless link, and leave the LPWMN through a DLN-service access point (SAP) corresponding to DLN and a DLC-SAP corresponding to DLC.

Setting up the channel hopping time-multiplexed wireless link may include selecting a neighboring router, a number of hops from which to the gateway router is less than a number of hops from a routing apparatus to the gateway router, and a link quality of which is equal to or greater than a preset reference quality, as a primary inner router, based on the DLN sublayers, and then starting joining the channel hopping time-multiplexed wireless link.

The method may further include grouping the routers and devices into clusters, and assigning router identifiers and device identifiers to the clusters.

Grouping the routers and devices into clusters and assigning router identifiers and device identifiers may include configuring the LPWMN in a form of a tree between an upper cluster and a lower cluster, and configuring the clusters in a form of an intra-cluster mesh in each cluster and an inter-cluster mesh between routers of neighboring clusters.

Grouping the routers and devices into clusters and assigning router identifiers and device identifiers may include assigning each of the routers and the devices a cluster identifier required to identify a cluster including the router and the device and a locator identifier required to identify locations of the router and the device in the cluster.

Grouping the routers and devices into clusters and assigning router identifiers and device identifiers may include, when the routing apparatus is a cluster root router, simultaneously assigning the routing apparatus both a device identifier corresponding to an upper cluster to which the cluster root router is connected as a device, and a router identifier corresponding to a lower cluster to which the cluster root router is connected as a router.

Setting up the channel hopping time-multiplexed wireless link may include, when the routing apparatus is a cluster root router based on the DLN sublayers, receiving cluster connectivity matrix information from the gateway router differing from the routing apparatus and joining the LPWMN, and when the routing apparatus is not a cluster root router, receiving cluster connectivity matrix information from a cluster root router differing from the routing apparatus and joining the LPWMN.

Setting up the channel hopping time-multiplexed wireless link may include receiving, based on the DLC sublayers, a link network management command frame having a leave command payload from the cluster root router differing from the routing apparatus and then leaving the LPWMN.

Transferring the data frames may be configured to use a contention access period (CAP) link, and transfer data frames without checking transfer of the data frames and performing flow control in a case of a first connection quality; use the CAP link, check transfer of data frames, and transfer the data frames without performing flow control in a case of a second connection quality; use a shared link, and transfer data frames without checking transfer of the data frames and performing flow control in a case of a third connection quality; use the shared link, check transfer of data frames, and transfer the data frames without performing flow control in the case of a fourth connection quality; use a dedicated link, and transfer data frames without checking transfer of the data frames and performing flow control in a case of a fifth connection quality; and use the dedicated link, check transfer of data frames, and transfer the data frames without performing flow control in a case of a sixth connection quality.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings. In the following description of the present invention and attached drawings, detailed descriptions of known functions and configurations which are deemed to make the gist of the present invention obscure will be omitted. It should be noted that the same reference numerals are used to designate the same or similar elements throughout the drawings.

The terms and words used in the present specification and claims should not be interpreted as being limited to their typical meaning based on the dictionary definitions thereof, but should be interpreted as having the meaning and concept relevant to the technical spirit of the present invention, on the basis of the principle by which the inventor can suitably define the implications of terms in the way which best describes the invention. Meanwhile, the configurations described in the present specification and the configurations illustrated in the drawings are merely preferred embodiments of the present invention and do not exhaustively present the technical spirit of the present invention. Accordingly, it should be appreciated that there may be various equivalents and modifications that can replace the embodiments and the configurations at the time at which the present application is filed. The terms such as "first" and "second" may be used to describe various components and are intended to merely distinguish one component from other components and are not intended to limit the components.

Figure 1:
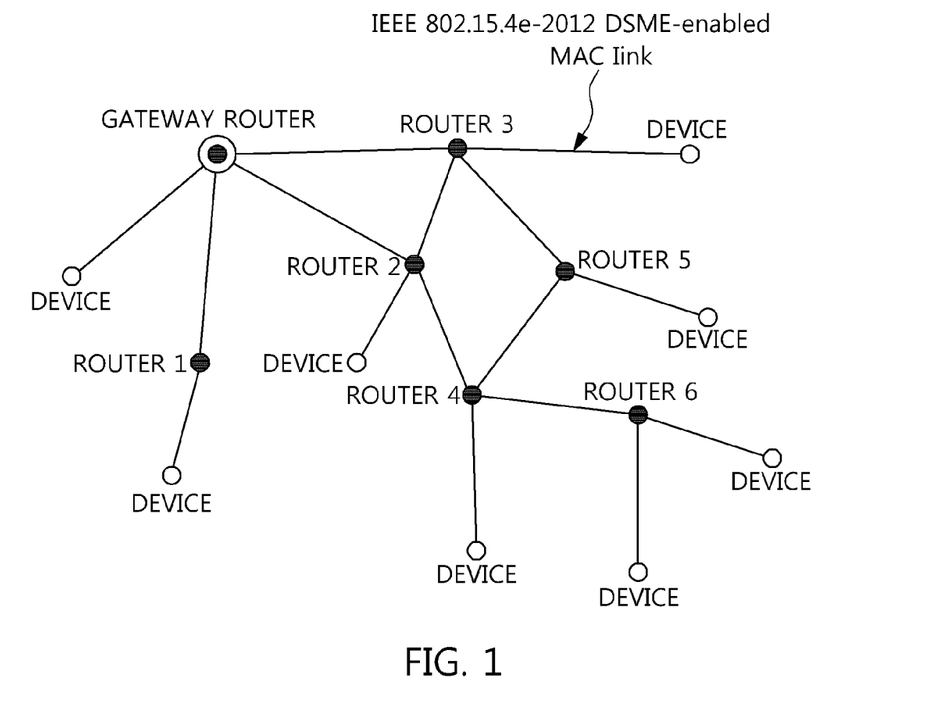
FIG. 1 is a diagram showing the topology of a low-power wireless mesh network according to the present invention.

FIG. 1 is a diagram showing the topology of a low-power wireless mesh network (LPWMN) according to the present invention.

Referring to FIG. 1, a LPWMN is composed of a gateway router, routers, and devices, and two nodes are connected via a channel hopping time-multiplexed access link.

In this case, the LPWMN is composed of a gateway router, routers, and devices having a structure in which an LPWMN function is divided into a link control function and a link network function.

The LPWMN is configured using an LPWMN primitive for activating the LPWMN function or providing notification of activation results.

Further, the LPWMN is configured via respective initiation procedures and LPWMN joining procedures for a gateway router, routers, and devices in order to configure the LPWMN.

Furthermore, the LPWMN is configured to group routers into clusters and assign router identifiers.

Furthermore, the LPWMN is configured to set up a link path between devices.

Furthermore, the LPWMN includes connection information and route information between clusters.

Furthermore, the LPWMN is configured to control the transfer of frames on a link path according to quality.

Furthermore, the LPWMN is configured to transfer a data frame, a link management command frame, and a link network management command frame between devices.

Figure 2:
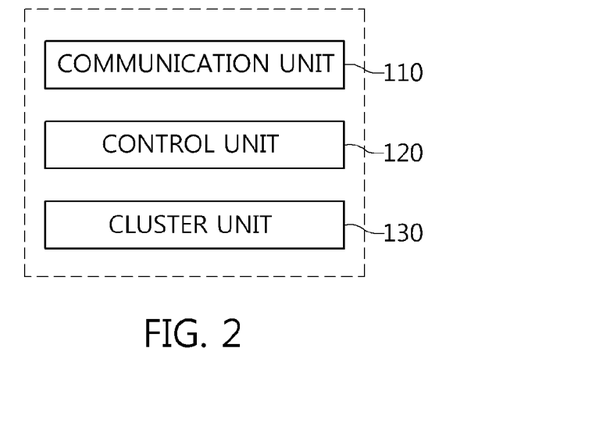
FIG. 2 is a block diagram showing a routing apparatus for configuring a low-power wireless mesh network based on channel hopping time-multiplexed wireless link according to an embodiment of the present invention.

FIG. 2 is a block diagram showing a routing apparatus for configuring an LPWMN based on a channel hopping time-multiplexed wireless link according to an embodiment of the present invention.

Referring to FIG. 2, the routing apparatus for configuring an LPWMN based on a channel hopping time-multiplexed wireless link according to the embodiment of the present invention includes a communication unit 110, a control unit 120, and a cluster unit 130.

The communication unit 110 transfers data frames to a gateway, routers, and devices depending on the connection quality of a channel hopping time-multiplexed wireless link.

In this case, the communication unit 110 may use a contention access period (CAP) link and transfer data frames without checking the transfer of data frames and performing flow control in the case of a first connection quality, may use the CAP link, check the transfer of data frames, and transfer the data frames without performing flow control in the case of a second connection quality, may use a shared link and transfer data frames without checking the transfer of the data frames and performing flow control in the case of a third connection quality, may use the shared link, check the transfer of data frames, and transfer the data frames without performing flow control in the case of a fourth connection quality, may use a dedicated link and transfer data frames without checking the transfer of the data frames and performing flow control in the case of a fifth connection quality, and may use the dedicated link, check the transfer of data frames, and transfer the data frames without performing flow control in the case of a sixth connection quality.

The control unit 120 sets up the channel hopping time-multiplexed wireless link to the gateway router, routers, and devices, based on deterministic and synchronous multi-channel extension (DSME) media access control (MAC) link control (DSME MAC Link Control: DLC) sublayers, and DSME MAC Link Network (DLN) sublayers.

In this case, the control unit 120 may operate LPWMN primitives for allowing the routing apparatus to join the LPWMN, set up the path of the channel hopping time-multiplexed wireless link, and leave the LPWMN through a DLN-service access point (SAP) corresponding to DLN and DLC-SAP corresponding to DLC.

The control unit 120 selects a neighboring router, the number of hops (hop count) from which to the gateway router is less than the number of hops from the routing apparatus to the gateway router, and the link quality of which is equal to or greater than a preset reference quality, as a primary inner router, based on the DLN sublayers, thus starting joining the channel hopping time-multiplexed wireless link.

In this case, when the routing apparatus is a cluster root router based on the DLN sublayers, the control unit 120 may receive cluster connectivity matrix information from the gateway router differing from the routing apparatus, and then join the LPWMN. Further, when the routing apparatus is not a cluster root router, the control unit 120 may receive cluster connectivity matrix information from a cluster root router differing from the routing apparatus and then join the LPWMN.

In this case, the control unit 120 may receive a link network management command frame having a leave command payload from a cluster root router differing from the routing apparatus, based on the DLC sublayers, and then leave the LPWMN.

The cluster unit 130 groups the routers and the devices into clusters, and assigns router identifiers and device identifiers to the corresponding clusters.

The cluster unit 130 configures the LPWMN in the form of a tree between upper clusters and lower clusters, and may also configure the clusters of the LPWMN in the form of an intra-cluster mesh between the routers of each cluster and an inter-cluster mesh between the routers of neighboring clusters.

The cluster unit 130 may assign each of the routers and devices a cluster identifier required to identify a cluster including the router and the device, and a locator identifier required to identify the locations of the router and the device in the cluster.

In this case, when the routing apparatus is the cluster root router, the cluster unit 130 may simultaneously assign a device identifier corresponding to an upper cluster to which the cluster root router is connected as a device, and a router identifier corresponding to a lower cluster to which the cluster root router is connected as a router.

Figure 3:
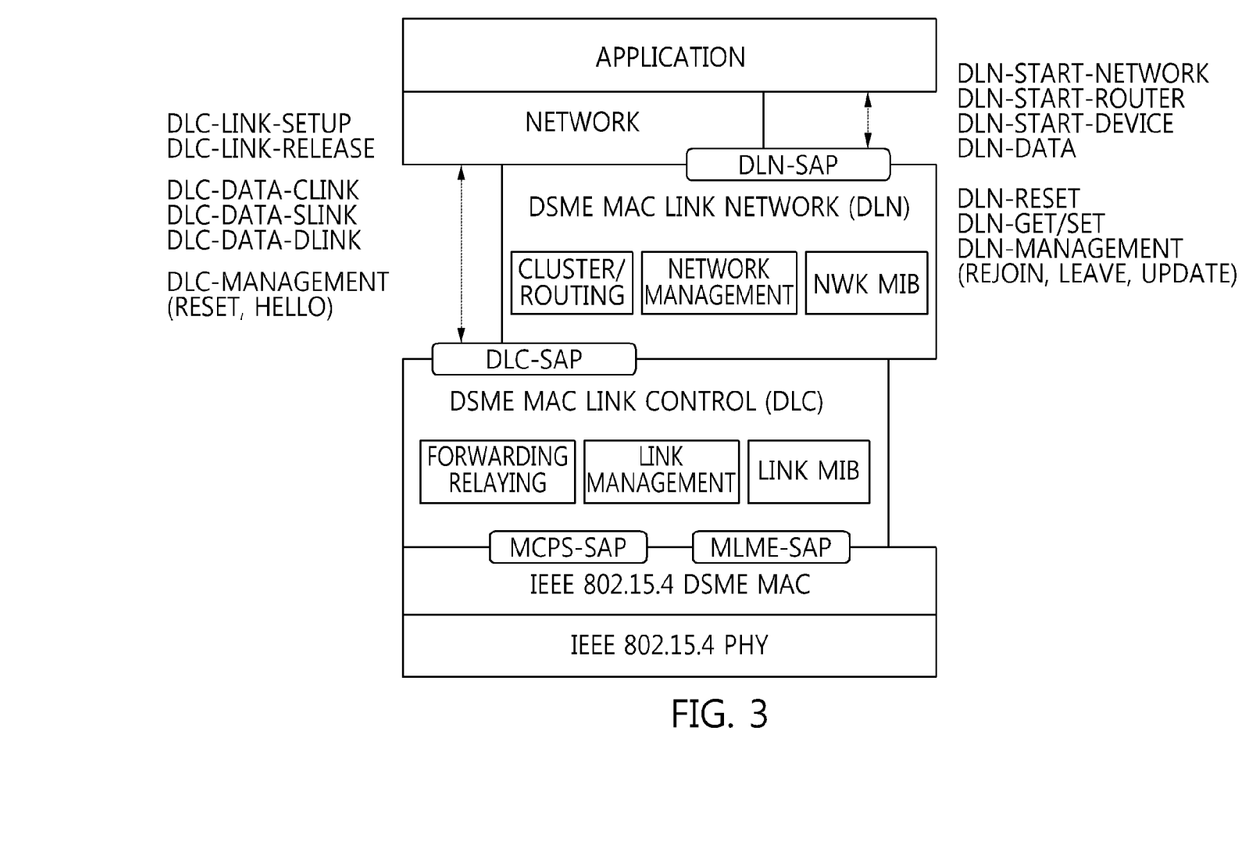
FIG. 3 is a diagram showing an example of a layer structure of a gateway router, routers, and devices according to the present invention.

FIG. 3 is a diagram showing an example of a layer structure of a gateway router, routers, and devices according to the present invention.

Referring to FIG. 3, a gateway router, routers, and devices constituting the LPWMN may be physically applied to IEEE 802.15.4 physical (PHY) layer or any wireless physical layer.

As a MAC layer, an IEEE 802.15.4e DSME MAC layer or any time division multiple access (TDMA) MAC layer may be applied.

In particular, the layer structure of the gateway router, the routers, and the devices includes DSME MAC link control (DLC) sublayers and DSME MAC link network (DLN) sublayers.

The DLC sublayers provide the function of controlling a wireless link for TDMA MAC, and DLN sublayers provide a routed link path to an upper layer. The sublayers are connected using a control protocol between DLC sublayers and DLN sublayers and a control protocol between the DLN sublayers. A DLC sublayer and a DLN sublayer provide service primitives to their own upper layers, respectively.

The gateway router, routers, and devices constituting the LPWMN operate LPWMN primitives for joining the LPWMN, completing the joining, and leaving the LPWMN.

In this case, the LPWMN primitives are operated by the DLN-SAP corresponding to DLN, and the DLC-SAP corresponding to DLC.

In this case, the LPWMN primitives operated by the DLN-SAP are given by the following Table 1.

TABLE 1

| DLN Primitive | Request | Indication | Response | Confirm |
| --- | --- | --- | --- | --- |
| DLN-START-NETWORK | ○ | X | X | ○ |
| DLN-START-ROUTER | ○ | X | X | ○ |
| DLN-START-DEVICE | ○ | X | X | ○ |
| DLN-RESET | ○ | X | X | ○ |
| DLN-GET | ○ | X | X | ○ |
| DLN-SET | ○ | X | X | ○ |
| DLN-MANAGEMENT | ○ | X | X | ○ |
| DLN-DATA | ○ | ○ | | ○ |

In this case, the LPWMN primitives operated by the DLC-SAP are given by the following Table 2.

TABLE 2

| DLC Primitive | Request | Indication | Response | Confirm |
| --- | --- | --- | --- | --- |
| DLC-LINK-SETUP | ○ | ○ | ○ | ○ |
| DLC-LINK-RELEASE | ○ | ○ | ○ | ○ |
| DLC-MANAGEMENT | ○ | X | X | ○ |
| DLC-DATA-CLINK | ○ | ○ | X | ○ |

TABLE 2-continued

| DLC Primitive | Request | Indication | Response | Confirm |
| --- | --- | --- | --- | --- |
| DLC-DATA-SLINK | ○ | ○ | X | ○ |
| DLC-DATA-DLINK | ○ | ○ | ○ | ○ |

In this case, the LPWMN function is activated using the request primitive and the response primitive of Table 1 from the upper layer of DLN, and is activated using the request primitive and the response primitive of Table 2 from the upper layer of DLC.

The results of the LPWMN function of the DLC layer activated by a lower layer are reported to the upper layer through the DLC-SAP using the indication primitive and confirm primitive of Table 2, and the results of the LPWMN function of the DLN layer activated by a lower layer are reported to the upper layer through the DLN-SAP using the indication primitive and confirm primitive of Table 1.

Figure 4:
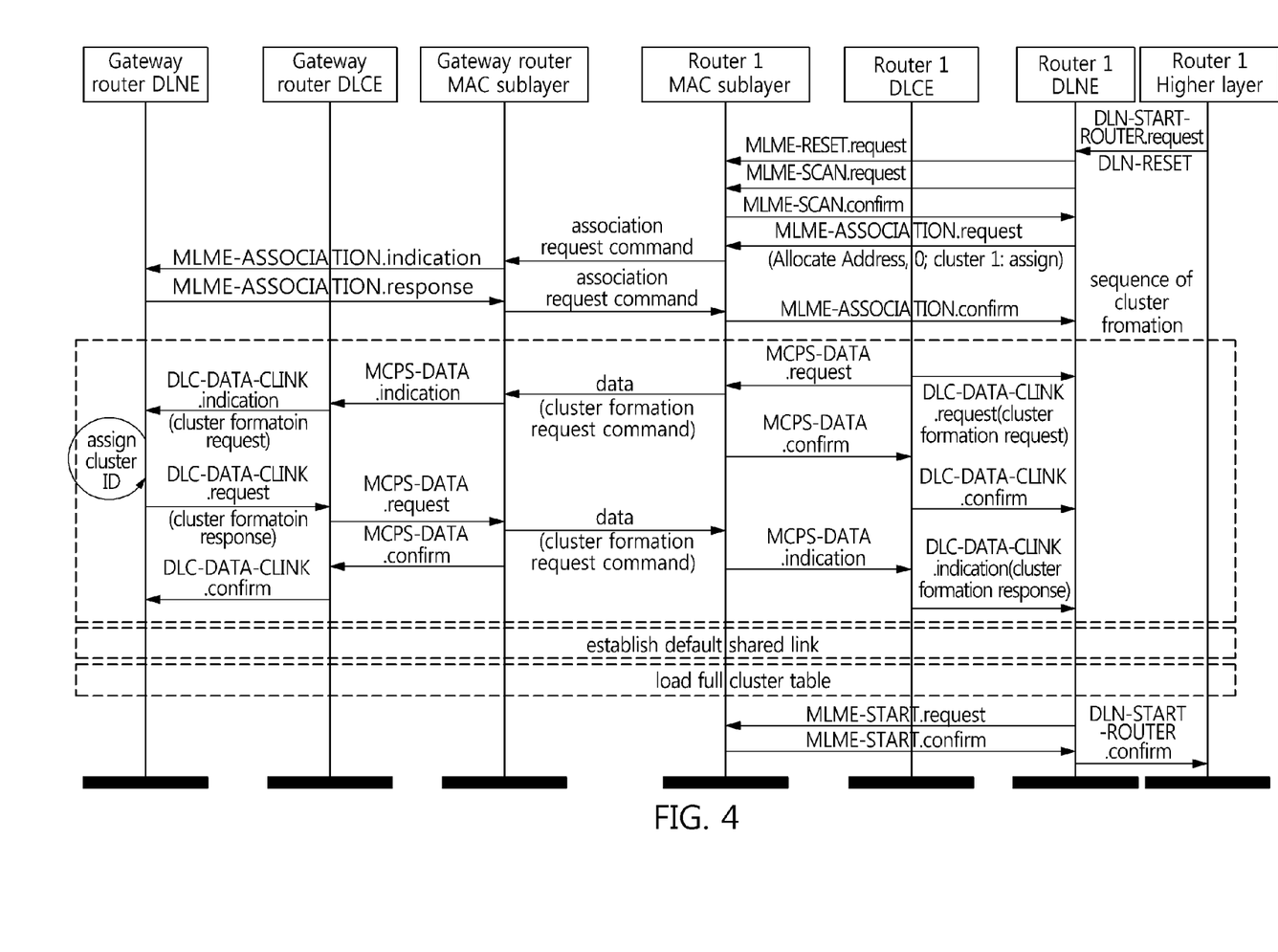
FIG. 4 is an operation flowchart showing an embodiment of a method in which a gateway router, routers, and devices join a low-power wireless mesh network according to the present invention.

FIG. 4 is an operation flowchart showing an embodiment of a method in which a gateway router, routers, and devices join an LPWMN according to the present invention.

Referring to FIG. 4, the gateway router activates an LPWMN link network start function via a DLN-START-NETWORK.request primitive.

Further, a gateway router link network unit (DSME MAC link network entity: DLNE) scans the surrounding IEEE 802.15.4-based network of a set frequency band and finds non-overlapping channel hopping sequence and beacon start point when a channel occupied by the surrounding network and a superframe overlap each other, and thus initiates a LPWMN link network superframe.

In this case, the router activates a router start function using a DLN-START-ROUTER.request primitive.

A router DLNE scans the IEEE 802.15.4e network, and selects a neighboring router, the number of hops (hop count) from which to the gateway router is small, and the link quality of which is equal to or greater than the reference quality, as a primary inner router, thus starting a link network join procedure.

In this case, when the corresponding router is designated as a cluster root router, the router DLNE, as a cluster root router DLNE, requests the gateway router to allocate a cluster identifier by transmitting a cluster formation request command to the gateway router using a DLC-DATA-CLINK.request primitive after DSME link association, and then receives DLC-DATA-CLINK.confirm from the gateway router, thus forming a cluster.

In this case, the cluster root router DLNE transmits a DLC-LINK-SETUP.request primitive to the gateway router, and receives DLC-LINK-SETUP.confirm from the gateway router, thus establishing a shared link from the cluster root router to the gateway router.

Thereafter, in order to obtain link network routing information from the gateway router, the cluster root router DLNE sets the Route Update Request Type field of a link network management command frame to a full cluster connectivity matrix, transmits the full cluster connectivity matrix to the gateway router using a DLC-DATA-SLINK-.request primitive, and receives cluster connectivity matrix information from the gateway router using a DLC-DATA-SLINK.indication primitive, thus completing joining of the cluster root router in the LPWMN.

Further, when the corresponding router is not designated as a cluster root router, the router DLNE obtains a router address using DSME link association. Thereafter, the router DLNE, as a normal router DLNE, transmits a DLC-LINK- SETUP.request primitive to the primary inner router, and receives a DLC-LINK-SETUP.confirm primitive from the primary inner router, thus establishing a shared link from the normal router to the primary inner router.

In this case, in order to obtain link network routing information from the cluster root router, the normal router DLNE sets the Route Update Request Type field of the link network management command frame to a full cluster connectivity matrix, transmits the full cluster connectivity matrix to the cluster root router using a DLC-DATA-SLINK.request primitive, and receives cluster connectivity matrix information from the cluster root router using a DLC-DATA-SLINK.indication primitive, thus completing the joining of the normal router in the LPWMN.

In this case, if the cluster root router or the normal router has joined the LPWMN, the cluster root router DLNE or the normal router DLNE notifies the upper layer that the start procedure of the device has been completed, using a DLN-START-DEVICE.confirm primitive.

Each device activates a device start function using a DLN-START-DEVICE.request primitive.

The device DLNE scans an IEEE 802.15.4e network, and selects a neighboring router, the number of hops from which to the gateway router is small, and the link quality of which is equal to or greater than the reference quality, as a primary inner router. If DSME link association with the primary inner router has been completed, the device DLNE notifies an upper layer that the start procedure of the device has been completed, using a DLN-START-DEVICE.confirm primitive.

Figure 5:
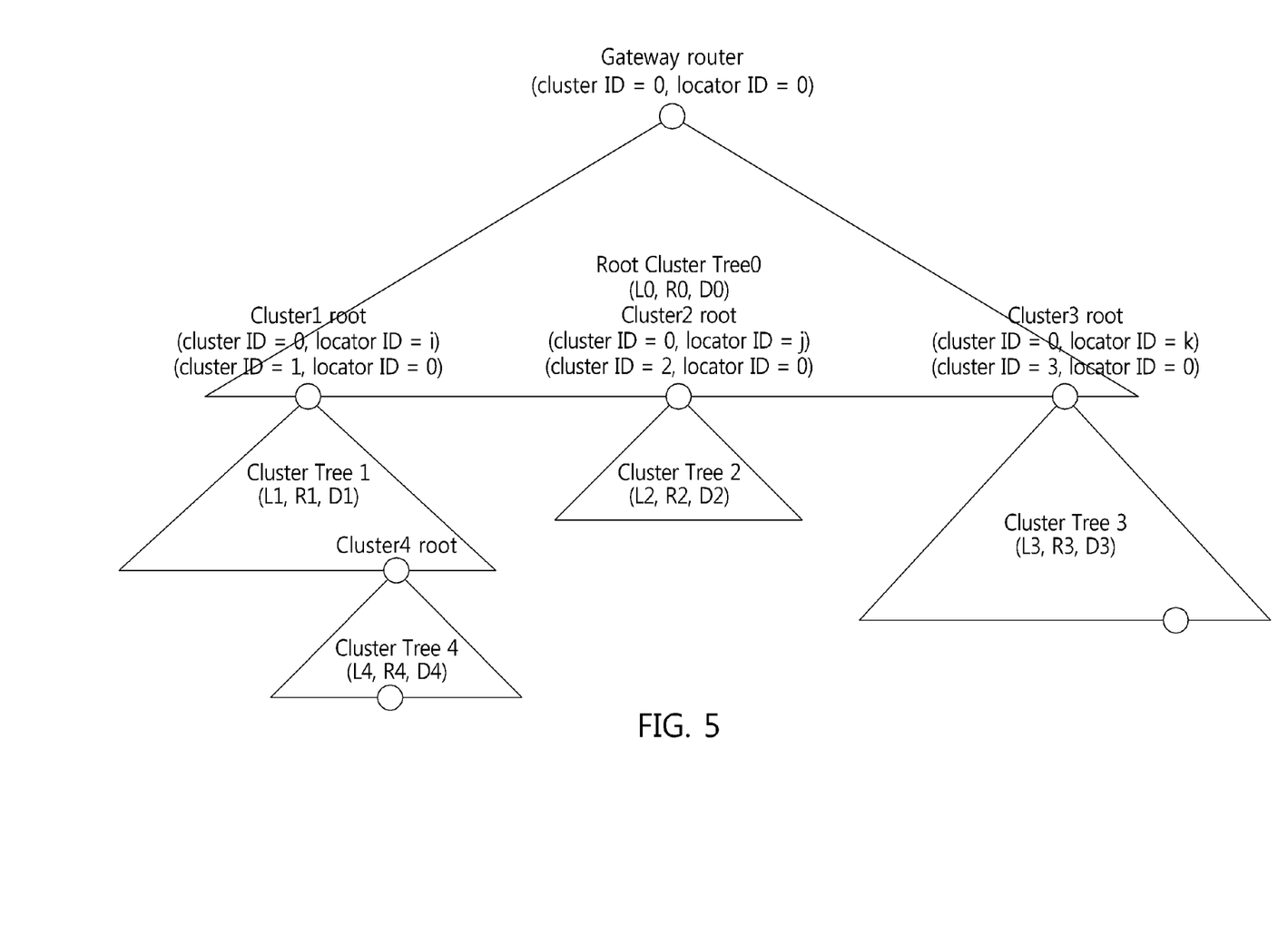
FIG. 5 is a diagram showing an example of grouping of routers into clusters and the assignment of router identifiers according to the present invention.

FIG. 5 is a diagram showing an example of grouping of routers into clusters and the assignment of router identifiers according to the present invention.

Referring to FIG. 5, an LPWMN is composed of clusters in which devices are connected in a tree structure, and each cluster is composed of a cluster root router, routers, and devices.

In this case, device identifiers are composed of a cluster identifier (cluster ID) used to identify each cluster and an intra-cluster device locator identifier (locator ID) used to identify the location of each device in the cluster.

The intra-cluster device locator ID of the cluster root router is assigned '0.'

In this case, the cluster root router has both the device identifier of an upper cluster connected thereto and a cluster root router identifier.

For example, a first cluster root router has both the device identifier (cluster ID=0 and locator ID=i) of the connected upper cluster (cluster ID=0) and a cluster root router identifier (cluster ID=1 and locator ID=0).

In this case, identifiers are distributed and assigned to routers or devices in the cluster depending on the maximum cluster depth, the maximum number of devices connectable to each router, and the maximum number of devices connectable to the router.

Figure 6:
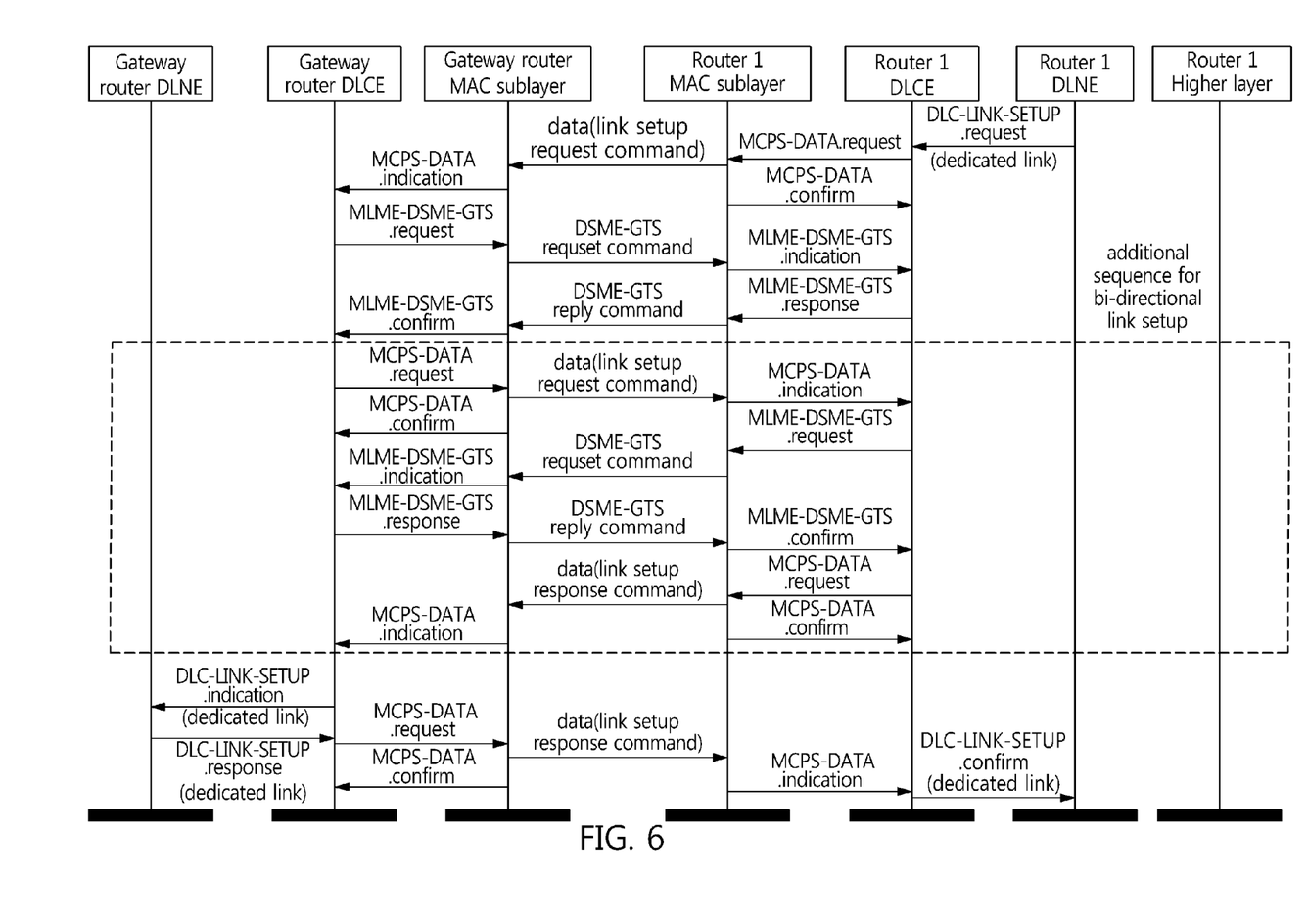
FIG. 6 is an operation flowchart showing an embodiment of a method of setting up a shared link between devices according to the present invention.

FIG. 6 is an operation flowchart showing an embodiment of a method of setting up a shared link between devices according to the present invention.

Referring to FIG. 6, the LPWMN provides the setup of a link path between any two devices.

When the two devices are adjacent to each other, a link is set up, whereas when the two devices are spaced apart from each other by a multi-hop distance, a link path for connecting links is set up.

Here, the link path has directionality and may be either of a unidirectional link path and a bidirectional link path.

The link path may be either of a shared link path and a dedicated link path according to the method of limiting the use of devices after the path has been set up.

In this case, link paths may be divided into a link path heading for a root router among routers in a cluster, a link path originating from a root router, and an inter-cluster mesh link path between the routers of neighboring clusters.

The setup of a link path is initiated in response to a request received, using a DLC-LINK-SETUP.request primitive, from the upper layer of the DLC sublayer of a device that requested the setup of the link path.

A DSME MAC link control entity (DLCE) requesting the setup of a link obtains information about a neighboring router that can reach a destination device from a route table, and sends a link setup request control frame to the neighboring router through a contention access period (CAP) link or a previously setup unique link.

When a link, through which the final destination of the link path is reachable, is present in the route table, the neighboring router determines whether a DSME guaranteed time slot (GTS) required to set up a link between the neighboring router and the device requesting the setup of a link can be allocated. If the allocation of the DSME GTS is possible, the neighboring router sends a DSME-GTS request MAC command frame to the link setup requesting device.

The neighboring router is configured to, if a DSME-GTS reply MAC command frame is received from the link setup requesting device, determine that a link to the link setup requesting device has been set up, and revises a link table.

If the setup of a bidirectional link is required, the neighboring router sends a link setup request control frame to a device that requested the setup of the link. The link setup requesting device that received the request control frame sends a DSME-GTS request MAC command frame to the neighboring router. If a DSME-GTS reply MAC command frame is received from the neighboring router, the link setup requesting device sends a link setup response control frame to the neighboring router, thus notifying the neighboring router that the setup of the bidirectional link has been completed.

If the neighboring router is the final destination of the link path, the neighboring router sends a link setup response control frame to the link setup requesting device, thus notifying the link setup requesting device that the setup of the link path has been completed.

If the neighboring router is not the final destination of the link path, the above-described procedure is repeatedly performed on a subsequent router heading for the selected final destination.

Figure 7:
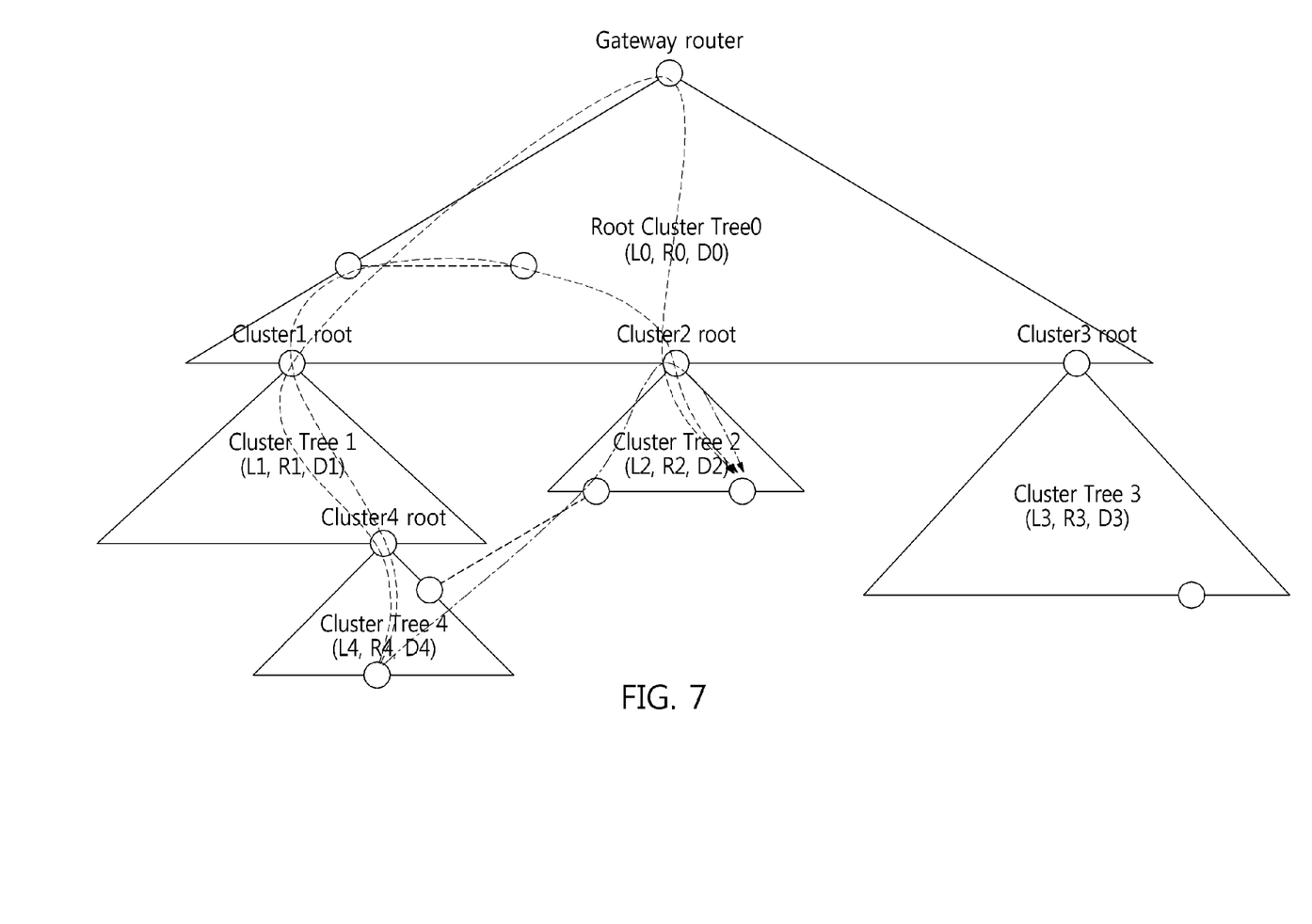
FIG. 7 is a diagram showing an example of connection information and route information between clusters according to the present invention.

FIG. 7 is a diagram showing an example of connection information and route information between clusters according to the present invention.

Referring to FIG. 7, the clusters of the LPWMN are connected in the form of a tree between upper clusters and lower clusters, an intra-cluster mesh between routers in each cluster, or an inter-cluster mesh between the routers of neighboring clusters.

Cluster configuration information is represented in a cluster table, which is shown in the following Table 3.

TABLE 3

| Name | Type | Range | Description |
| --- | --- | --- | --- |
| Router Address | Integer | 0x0000-0xfffd | The 16-bit address assigned to the router which is the root of the cluster or has a mesh link to the other cluster |
| Router Extended Address | IEEE address | Device specific | The extended address assigned to the router |
| Router Reflector Address | Integer | 0x0000-0xfffd | The 16-bit address of the router as a child of the parent cluster or the counterpart router of the mesh link |
| Depth | Integer | 0x00-0xff | The number of hops to the gateway router from the root router of the cluster |
| Max Depth (L) | Integer | 0x00-0xff | The depth a device can have in the cluster |
| Max Routers (R) | Integer | 0x00-0xff | The number of routers any one device is allowed to have as children |
| Max Children (D) | Integer | 0x00-0xff | The number of devices allowed to connect to a router of the cluster as a child |
| Child Cluster List | Set | Variable | The list of clusters of which the root routers are children of this cluster |

The entries of the cluster table are configured using the connection information of routers coupled to a cluster root router or an inter-cluster mesh link, and the standards of the clusters.

The entries of the cluster table of the cluster root router include address information such as a router address, a router extended address, and an address allocated to the cluster root router in an upper cluster, the number of hops (hop count) between a gateway router defining the standards of the cluster and the cluster root router, the depth of the cluster, the maximum number of accessible routers, the maximum number of accessible devices, the address of the root router of a lower cluster belonging to the cluster, etc.

The entries of the cluster table of a router connected to the inter-cluster mesh link include the address information of an opposite end router connected to the link.

A cluster connectivity matrix includes information extracted from a cluster table. By using the identifier of a cluster as an index, the matrix is implemented as a list of identifiers of clusters connected to that cluster.

The entries of the cluster table are managed by the gateway router. The entries of the cluster table are added when a cluster root router joins the LPWMN and requests the allocation of a new cluster from the gateway router, or when an inter-cluster mesh link is generated. When a cluster root router leaves the LPWMN or when an inter-cluster mesh link is released, the entry of the corresponding cluster table is deleted, and information of the cluster connected thereto is also revised.

The cluster root router is provided with cluster table information from the gateway router or the root router of an upper connected cluster. A router in a cluster is provided with a router address and cluster table information from a cluster root router when joining the cluster.

The route table of the LPWMN is given as shown in the following Table 4.

TABLE 4

| Name | Type | Range | Description |
| --- | --- | --- | --- |
| Router Address | Integer | 0x0000-0xfffd | The 16-bit destination address or the cluster ID of the destination device |
| Link Path List | Set | Variable | The list of link path |

The link path is given as shown in the following Table 5.

TABLE 5

| Name | Type | Range | Description |
| --- | --- | --- | --- |
| Link ID | Integer | 0x0000-0xfffd | The link identifier |
| Link Path Cost | Integer | 0x0000-0xfffd | The cost of the link path |

The information of the link path is given as shown in the following Table 6.

TABLE 6

| Name | Type | Range | Description |
| --- | --- | --- | --- |
| Link ID | Integer | 0x0000-0xfffd | The link identifier |
| Link Type | Enumeration | IN-SHARED, OUT-SHARED, IN-DEDICATED, OUT-DEDICATED, IN-PEER, OUT-PEER | The type of link |
| Neighbor Address | Integer | 0x0000-0xfffd | The 16-bit address of the device located at North of the link |
| Rx Superframe ID | Integer | 0x0000-0xffff | The index of the superframe in a multi-superframe which has the rx link |
| RX slot ID | Integer | 0x0000-0xffff | The index of the slot in the superframe which has the rx link |
| Tx Superframe ID | Integer | 0x0000-0xfffd | The index of the superframe in a multi-superframe which has the tx link |

TABLE 6-continued

| Name | Type | Range | Description |
| --- | --- | --- | --- |
| Tx slot ID | Integer | 0x0000-0xfffd | The index of the slot in the superframe which has the tx link |
| Number Slot | Integer | 0x0000-0xffff | The number of slots allocated sequentially to the link |
| Link Quality | Integer | 0x0000-0xffff | The quality of the link |
| Frame Count | Integer | 0x0000-0xffff | The Count of frames received or transmitted in the unit time |

The route table of the LPWMN is implemented using a list of destination addresses and link paths, wherein each link path is composed of a link path identifier and a link path cost, and the information of each link path is composed of a link path identifier, a link type, the address of a neighboring router (neighbor address), reception (rx) link slot information, transmission (tx) link slot information, the number of slots allocated to the link, link quality, the count of frames to be transmitted/received in the unit time, etc.

The selection of a route is performed by selecting a path between clusters that can be connected to a cluster including a destination device, based on a cluster connectivity matrix.

A neighboring cluster which can be connected to a destination cluster is selected depending on the route table information of neighboring clusters collected by a cluster root router or an inter-cluster router.

Possible routes to the destination device are selected depending on whether link paths between routers that can be connected to the cluster root router or to the inter-cluster router within the cluster have been set up.

For the possible routes, the priorities thereof are determined depending on the sum of the costs of link paths applied to the respective routes, and the possible routes are sequentially stored in the link path list of the route table entries.

A route table entry is added if the router completes the setup of link paths, or if a route can be created when requesting an initially designated destination device to transfer data. A route table entry is deleted if the corresponding link path is released or is not used for a predetermined period of time.

The route table maintained by each router is managed such route table entries are separated into route table entries based on the link paths managed thereby and route table entries collected from neighboring routers.

The cluster root router manages the route tables of routers within the cluster in an integrated manner. When there is a change in route table entries, the corresponding router notifies the cluster root router of such a change using a link network management command frame having a route update response command payload.

The inter-cluster router provides cluster route table information to the inter-cluster router of a neighboring cluster. Further, the inter-cluster router receives neighboring cluster route table information from the inter-cluster router of the neighboring cluster, and notifies the cluster root router of the received cluster route table information.

The cluster root router aperiodically or periodically revises (updates) the route table information of the respective routers using a link network management command frame having a route update request command payload.

Figure 8:
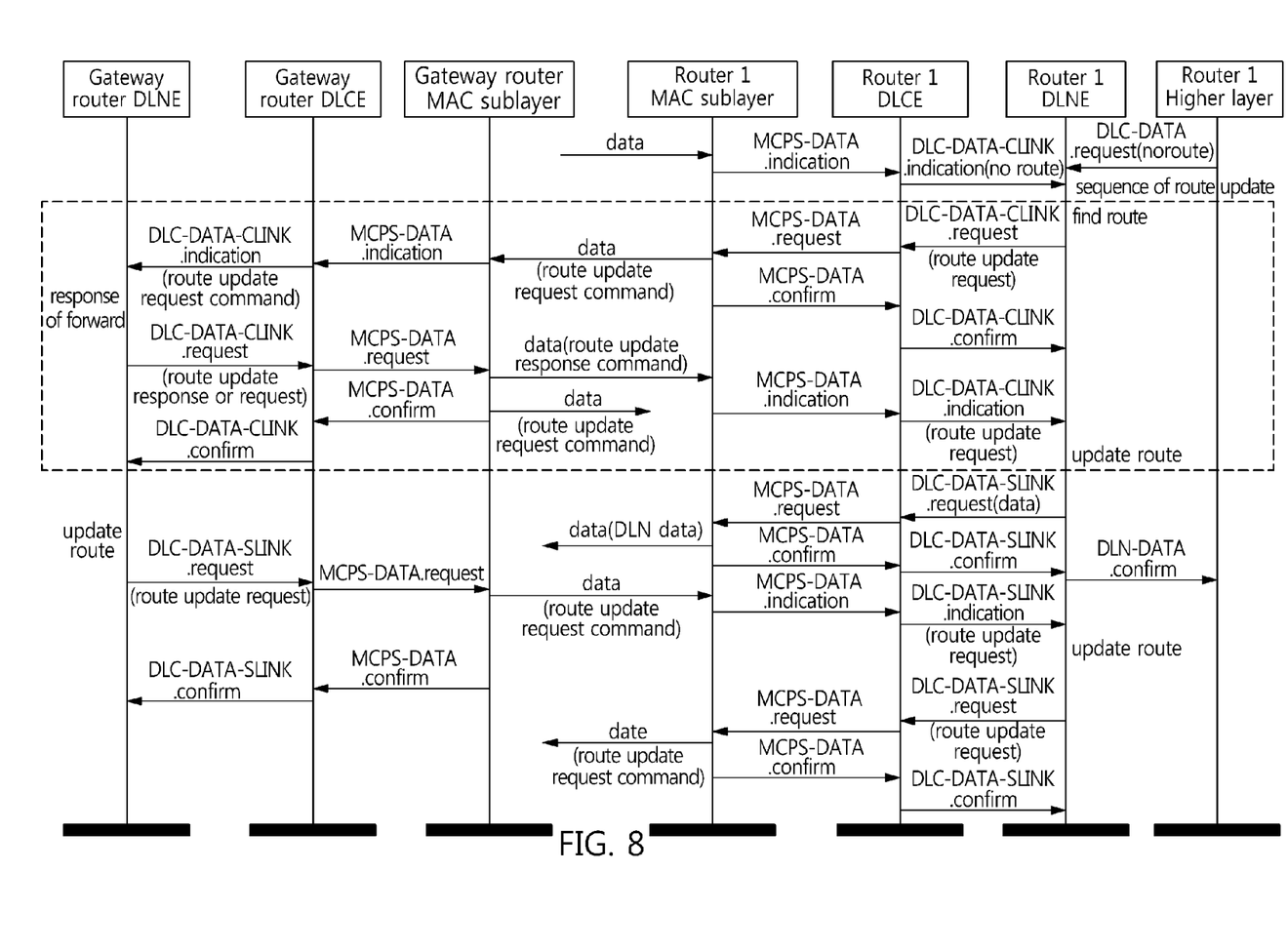
FIG. 8 is an operation flowchart showing an embodiment of a method of controlling the transfer of frames depending on connection qualities according to the present invention.

FIG. 8 is an operation flowchart showing an embodiment of a method of controlling the transfer of frames depending on connection qualities according to the present invention.

Referring to FIG. 8, connection qualities between DLCEs at both ends of the LPWMN are divided into six types and then the transfer of frames is controlled.

Class 1 uses a CAP link, and is configured to transfer frames without checking the transfer of the frames and performing flow control.

Class 2 uses the CAP link, and is configured to check the transfer of frames, but transfers the frames without performing flow control.

Class 3 uses a shared link, and is configured to transfer frames without checking the transfer of the frames and performing flow control.

Class 4 uses the shared link, and is configured to check the transfer of frames, but transfers the frames without performing flow control.

Class 5 uses a dedicated link, is configured to transfer frames without checking the transfer of the frames and performing flow control.

Class 6 uses the dedicated link, and is configured to check the transfer of frames, but transfers the frames without performing flow control.

Each DLCE performs routing when a data frame transfer request is received from an upper layer or when a frame received from a neighboring router is forwarded. Unless the destination address of the frame is found in the route table or the cluster table, the DLNE requests the cluster root router to update the cluster table.

Figure 9:
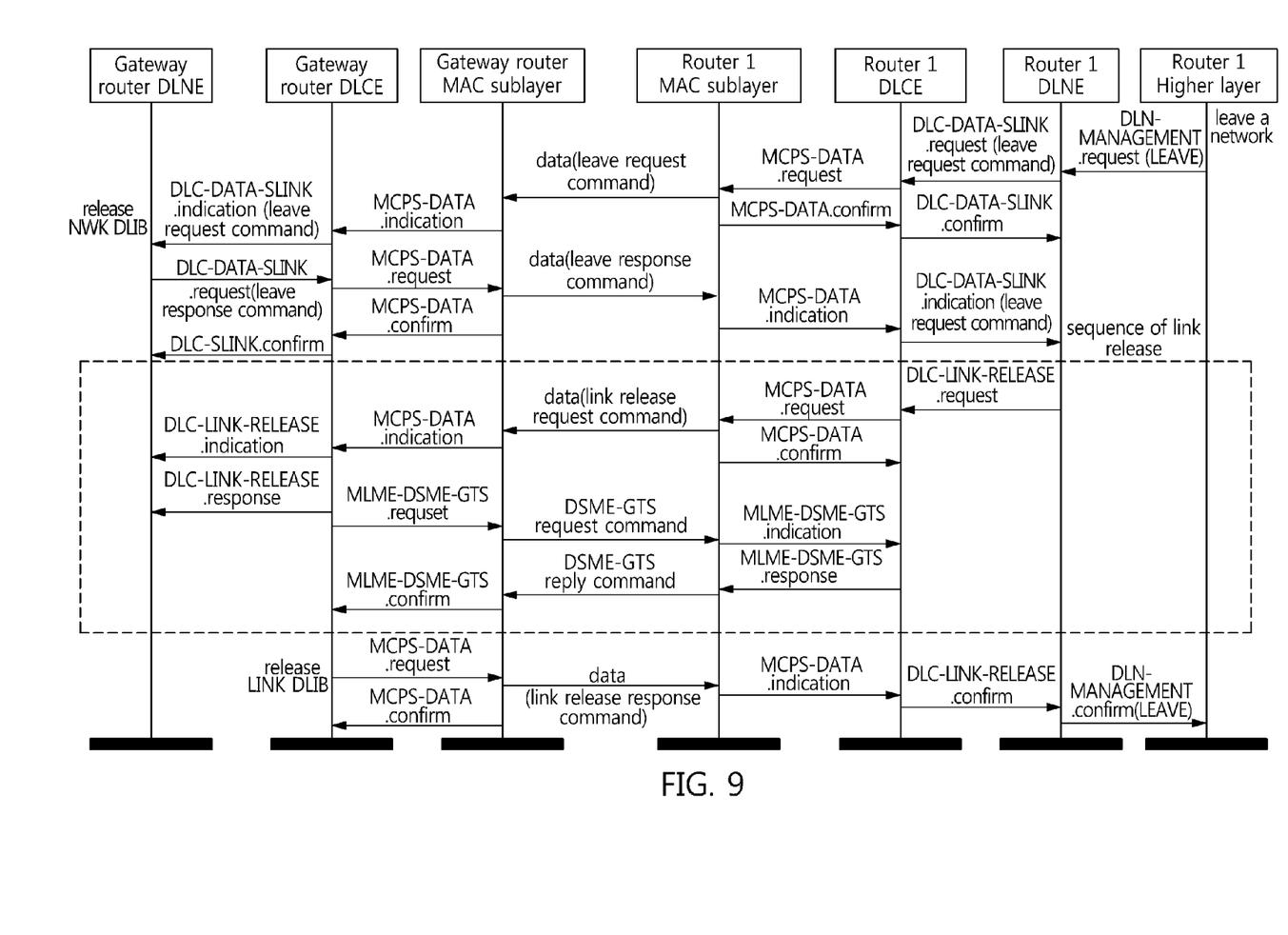
FIG. 9 is an operation flowchart showing an embodiment of a method of leaving a low-power wireless mesh network according to the present invention.

FIG. 9 is an operation flowchart showing an embodiment of a method of leaving a LPWMN according to the present invention.

Referring to FIG. 9, devices at both ends of the set-up link path manage the state of a link path. The DLCE of the device transmits a link management request command frame having a link hello request command payload to the end device of the link path via a set-up link. The link path end device responds to the request as a link management command frame having a link hello response command payload.

When the link management response command frame does not arrive within a link management timeout, the checking of the state of a link path is attempted as many times as the number of link management trials. If there is no response or if the state of the link path is not normal, the setup of the link path is released.

If the router does not have a set-up link path for a predetermined period of time, the start procedure of the router is periodically performed.

If the router leaves the cluster, it sends a link network management frame having a leave request command payload to the cluster root router. After receiving a link network management command frame having a leave response command payload from the cluster root router, the router sequentially releases link paths set up with neighboring routers or devices connected to the router.

The counterpart router that received a link network management command frame having a link release request command payload finishes recovering an allocated DSME-GTS, and then sends a link network management command frame having a link release response command payload to the router that requested leaving the network.

Figure 10:
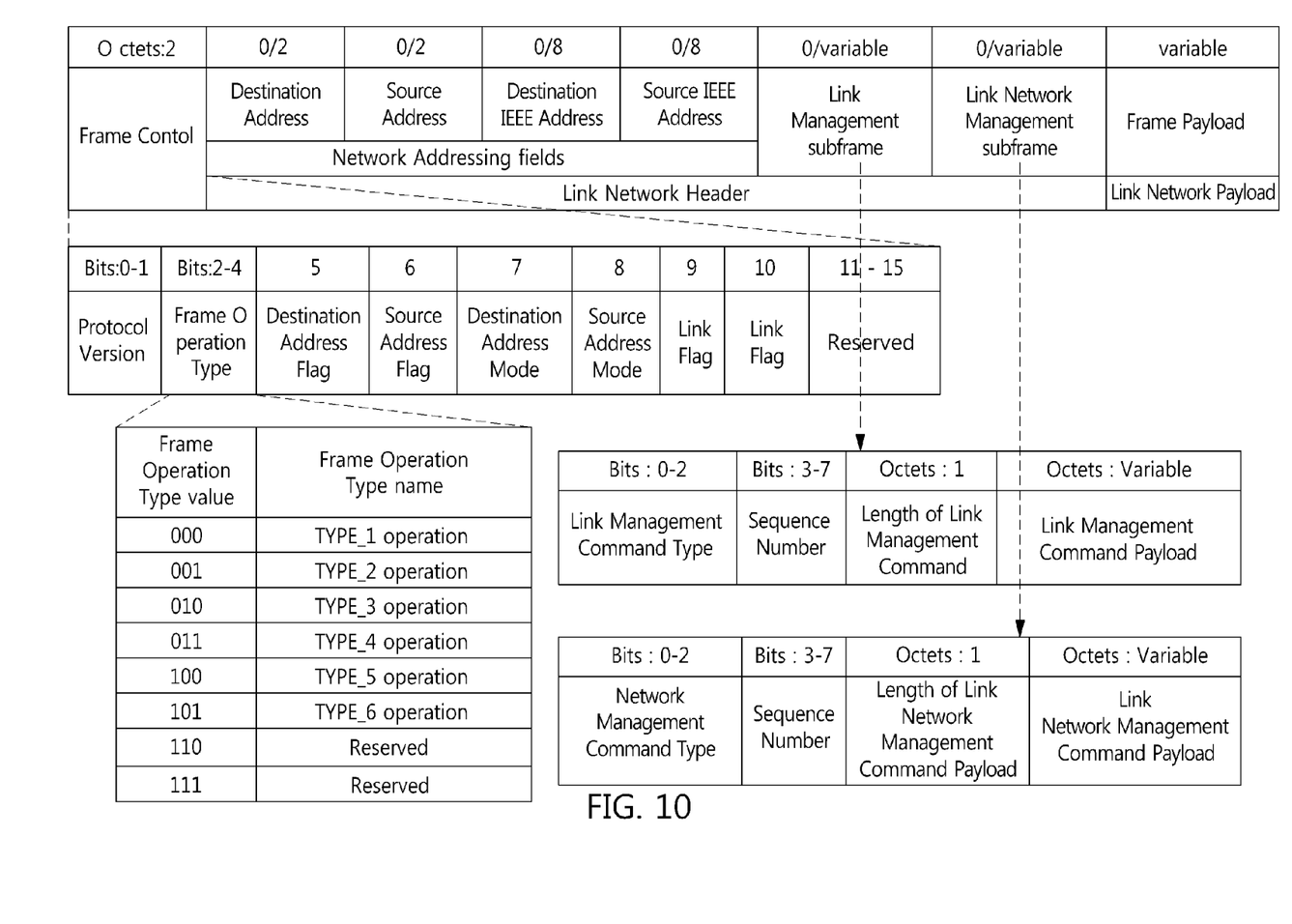
FIG. 10 is a diagram showing an example of the format of a network frame transferred between DLC sub-layers and DLN sub-layers according to the present invention.

FIG. 10 is a diagram showing an example of the format of a network frame transferred between DLC sub-layers and DLN sub-layers according to the present invention.

Referring to FIG. 10, the format of the network frame transferred between DLC sublayers and between DLN sublayers according to the present invention includes a frame control field, a link network address field (Network Addressing field), a link management subframe field, a link network management subframe field, a frame payload field.

The link management subframe and the link network management subframe may be simultaneously transferred together with a frame payload.

The frame control field is composed of fields for protocol version, frame transfer processing (frame operation type) on a link, a destination address flag, a source address flag, a destination address mode, a source address mode, a link management subframe flag, a link network management subframe flag, etc. The field for frame transfer processing (frame operation type) on a link is divided into six types, and flags are set to '1' when the corresponding information is transmitted to a link network header.

The link management subframe field is divided into fields such as a link management command type, a sequence number, the length of a link management command payload, and a link management command payload. The link management command payload is divided into link path setup request and response, link path release request and response, and link path check request and response.

The link network management subframe field is composed of a link network management command type, a sequence number, length of a link network management command payload, and a link network management command payload. The link network management command payload is divided into cluster configuration request and response, routing information update request and response, link network leave request and response, and data flow control request and response.

In accordance with the present invention, a DLN sublayer and a DLC sublayer can provide a method of configuring an LPWMN, configuring a multi-hop path, transferring multi-quality data, selecting a path, and operating and maintaining a path in an LPWMN based on a channel hopping time-multiplexed wireless link, thus obtaining the advantages of providing the configuration of an LPWMN based on a channel hopping time-multiplexed wireless link and providing a flexible routing method.

As described above, in the routing apparatus for configuring an LPWMN based on a channel hopping time-multiplexed wireless link according to the present invention, the configurations and schemes in the above-described embodiments are not limitedly applied, and some or all of the above embodiments can be selectively combined and configured so that various modifications are possible.

What is claimed is:

1. A routing apparatus for configuring a low-power wireless mesh network (LPWMN) configured based on a channel hopping time-multiplexed wireless link, comprising:

a control unit for setting up a channel hopping time-multiplexed wireless link with a gateway router, one or more routers, and one or more devices based on deterministic and synchronous multi-channel extension (DSME) media access control (MAC) link control (DSME MAC link control: DLC) sublayers and DSME MAC link network (DLN) sublayers; and a communication unit for transferring data frames to the gateway router, routers, and devices based on data communication types through the channel hopping time-multiplexed wireless link, wherein the control unit operates LPWMN primitives for allowing the routing apparatus to loin the LPWMN, set up a path of the channel hopping time-multiplexed wireless link, and leave the LPWMN, wherein the LPWMN primitives comprise:

a DLN-START-NETWORK.request primitive for activating the LPWMN;

a DLN-START-ROUTER.request primitive for allowing the routers to loin the LPWMN;

a DLN-START-DEVICE.request primitive for allowing the devices to loin the LPWMN;

a DLC-DATA-CLINK.request primitive for allowing a cluster root router to request a cluster identifier allocation by transmitting a cluster formation request command;

a DLC-DATA-SLINK.request primitive for allowing the cluster root router to obtain a link network routing information by transmitting a link network management command frame containing a Route Update Request Type field set to a full cluster connectivity matrix; and a DLC-LINK-SETUP.request primitive for allowing a higher layer of the DLC sublayer to request a setup of a link path, wherein the link network routing information contains any one of a cluster configuration information, a route information, a link path information, and a neighbor link information, wherein the cluster configuration information comprises a router address, a router extended address, a router reflector address, a depth, a maximum depth, a maximum children, a maximum routers, and a child cluster list, wherein the route information comprises a destination address, and a link path list, wherein the link path information comprises a link ID, and a link path cost, and wherein the neighbor link information comprises a link ID, a link type, a neighbor address, a Rx superframe ID, a Rx slot ID, a Tx superframe ID, a Tx slot ID, a number slot, a link quality, and a frame count.

2. The routing apparatus of claim 1, further comprising a cluster unit for grouping the routers and devices into clusters.

3. The routing apparatus of claim 1, wherein the DLC sublayer entity (DLCE) obtains information about a neighboring router from a route table, transmits a link setup request control frame to the neighboring router on a contention access period (CAP) link or a preset shared link, and requests the cluster root router to update route if no route is found in the route table.

4. The routing apparatus of claim 1, wherein a neighboring router sends a DSME guaranteed time slot (GTS) request MAC command frame to the device for allocation of the DSME GTS.

5. The routing apparatus of claim 1, wherein the control unit is configured to, when the routing apparatus is the cluster root router based on the DLN sublayers, receive a cluster connectivity matrix information from the gateway router differing from the routing apparatus and join the LPWMN, and when the routing apparatus is not the cluster root router, receive the cluster connectivity matrix information from the cluster root router differing from the routing apparatus and joining the LPWMN.

6. The routing apparatus of claim 5, wherein the control unit receives, based on the DLC sublayers, the link network management command frame having a leave command payload from the cluster root router differing from the routing apparatus and then leaves the LPWMN.

7. The routing apparatus of claim 1, wherein the communication unit is configured to use the contention access period (CAP) link, and transfer data frames without checking transfer of the data frames and performing flow control in a case of a first type; use the CAP link, check transfer of data frames, and transfer the data frames without performing flow control in a case of a second type; use a shared link, and transfer data frames without checking transfer of the data frames and performing flow control in a case of a third type use the shared link, check transfer of data frames, and transfer the data frames without performing flow control in the case of a fourth type; use a dedicated link, and transfer data frames without checking transfer of the data frames and performing flow control in a case of a fifth type; and use the dedicated link, check transfer of data frames, and transfer the data frames without performing flow control in a case of a sixth type.

8. A method of configuring a low-power wireless mesh network (LPWMN) based on a channel hopping time-multiplexed wireless link, comprising:
    setting up a channel hopping time-multiplexed wireless link with a gateway router, one or more routers, and one or more devices based on deterministic and synchronous multi-channel extension (DSME) media access control (MAC) link control (DSME MAC link control: DLC) sublayers and DSME MAC link network (DLN) sublayers; and
    transferring data frames to the gateway router, routers, and devices based on data communication types through the channel hopping time-multiplexed wireless link,
    wherein setting up the channel hopping time-multiplexed wireless link comprises operating LPWMN primitives for allowing the routers and the devices to loin the LPWMN, set up a path of the channel hopping time-multiplexed wireless link, and leave the LPWMN,
    wherein the LPWMN primitives comprise:
    a DLN-START-NETWORK.request primitive for activating the LPWMN;
    a DLN-START-ROUTER.request primitive for allowing the routers to loin the LPWMN;
    a DLN-START-DEVICE.request primitive for allowing the devices to loin the LPWMN;
    a DLC-DATA-CLINK.request primitive for allowing a cluster root router to request a cluster identifier allocation by transmitting a cluster formation request command;
    a DLC-DATA-SLINK.request primitive for allowing the cluster root router to obtain a link network routing information by transmitting a link network management command frame containing the Route Update Request Type field set to a full cluster connectivity matrix; and
    a DLC-LINK-SETUP.request primitive for allowing a higher layer of the DLC sublayer to request a setup of a link path,
    wherein the link network routing information contains any one of a cluster configuration information, a route information, a link path information, and a neighbor link information,
    wherein the cluster configuration information comprises a router address, a router extended address, a router reflector address, a depth, a maximum depth, a maximum children, a maximum routers, and a child cluster list,
    wherein the route information comprises a destination address, and a link path list,
    wherein the link path information comprises a link ID, and a link path cost, and
    wherein the neighbor link information comprises a link ID, a link type, a neighbor address, a Rx superframe ID, a Rx slot ID, a Tx superframe ID, a Tx slot ID, a number slot, a link quality, and a frame count.

9. The method of claim 8, further comprising grouping the routers and devices into clusters.

10. The method of claim 8, wherein the DLC sublayer entity (DLCE) obtains information about a neighboring router from a route table, transmits a link setup request control frame to the neighboring router on a contention access period (CAP) link or a preset shared link, and requests the cluster root router to update route if no route is found in the route table.

11. The method of claim 8, wherein a neighboring router sends a DSME guaranteed time slot (GTS) request MAC command frame to the device for allocation of the DSME GTS.

12. The method of claim 8, wherein setting up the channel hopping timemultiplexed wireless link comprises, when the routing apparatus is the cluster root router based on the DLN sublayers, receiving a cluster connectivity matrix information from the gateway router differing from the routing apparatus and joining the LPWMN, and when the routing apparatus is not the cluster root router, receiving the cluster connectivity matrix information from the cluster root router differing from the routing apparatus and joining the LPWMN.

13. The method of claim 8, wherein setting up the channel hopping timemultiplexed wireless link comprises receiving, based on the DLC sublayers, the link network management command frame having a leave command payload from the cluster root router differing from the routing apparatus and then leaving the LPWMN.

14. The method of claim 8, wherein transferring the data frames is configured to use the contention access period (CAP) link, and transfer data frames without hecking transfer of the data frames and performing flow control in a case of a first type use the CAP link, check transfer of data frames, and transfer the data frames without performing flow control in a case of a second type; use a shared link, and transfer data frames without checking transfer of the data frames and performing flow control in a case of a third type; use the shared link, check transfer of data frames, and transfer the data frames without performing flow control in the case of a fourth type; use a dedicated link, and transfer data frames without checking transfer of the data frames and performing flow control in a case of a fifth type; and use the dedicated link, check transfer of data frames, and transfer the data frames without performing flow control in a case of a sixth type.

* * * * *